US012425107B2

(12) United States Patent
Bekele et al.

(10) Patent No.: US 12,425,107 B2
(45) Date of Patent: Sep. 23, 2025

(54) METHODS AND APPARATUSES FOR MAXIMIZING OUTPUT MODULATION AMPLITUDE FOR OPTICAL WAVELENGTH DIVISION MULTIPLEXED MICRO-RING MODULATORS

(71) Applicant: XILINX, INC., San Jose, CA (US)

(72) Inventors: Adebabay M. Bekele, San Jose, CA (US); Mayank Raj, San Jose, CA (US); Chuan Xie, Fremont, CA (US); Sandeep Kumar, Cork (IE); Zhaowen Wang, Sunnyvale, CA (US); Sukruth Pattanagiri Giriyappa, Bangalore (IN); Parag Upadhyaya, Los Gatos, CA (US); Yohan Frans, Palo Alto, CA (US)

(73) Assignee: XILINX, INC., San Jose, CA (US)

( * ) Notice: Subject to any disclaimer, the term of this patent is extended or adjusted under 35 U.S.C. 154(b) by 236 days.

(21) Appl. No.: 18/202,512

(22) Filed: May 26, 2023

(65) Prior Publication Data
US 2024/0396638 A1 Nov. 28, 2024

(51) Int. Cl.
*H04B 10/04* (2006.01)
*H04B 10/50* (2013.01)
(Continued)

(52) U.S. Cl.
CPC ......... *H04B 10/541* (2013.01); *H04B 10/505* (2013.01); *H04B 10/508* (2013.01)

(58) Field of Classification Search
CPC .. H04B 10/541; H04B 10/505; H04B 10/508; H04B 10/516; H04B 10/548;
(Continued)

(56) References Cited

U.S. PATENT DOCUMENTS

| 9,348,154 | B2 * | 5/2016 | Hayakawa | G02F 1/225 |
| 11,005,572 | B1 | 5/2021 | Chiang et al. | |
| 11,139,907 | B2 * | 10/2021 | Melikyan | H04B 1/1027 |
| 12,009,912 | B2 * | 6/2024 | Lin | H04B 10/506 |
| 2024/0405882 | A1 * | 12/2024 | Bekele | G02F 1/0147 |

OTHER PUBLICATIONS

Xie, Chuan, "Micro Ring Modulators for 11Gbps PAM4 operation—A Feasibility Study", Xilinx, Jul. 2019.
(Continued)

*Primary Examiner* — Hanh Phan
(74) *Attorney, Agent, or Firm* — Patterson + Sheridan, LLP (57) ABSTRACT

Some examples described herein provide for controlling output modulation amplitude for optoelectronic devices. In an example, a method includes transmitting a first data pattern to an optical modulator device. The method also includes determining, while transmitting the first data pattern and for each heater control value of a plurality of heater control values for a heater, a photodiode current value associated with the optical modulator device to generate a plurality of photodiode current values corresponding to the plurality of heater control values. The method also includes determining a maximum optical modulation amplitude for the optical modulator device based at least in part on the plurality of photodiode current values corresponding to the plurality of heater control values. The method also includes controlling the heater for the optical modulator device based on the maximum optical modulation amplitude.

20 Claims, 6 Drawing Sheets (51) Int. Cl.
*H04B 10/508* (2013.01)
*H04B 10/54* (2013.01)

(58) Field of Classification Search
CPC .............. H04B 10/532; H04B 10/0795; H04B 10/5059; H04B 10/50593; H04B 10/50595; H04B 10/50572; H04B 10/5057; H04B 10/50575; H04B 10/50577; G02B 6/29341; G02F 1/025; H04J 14/0283
USPC ....... 398/183, 188, 186, 187, 192, 193, 194, 398/195, 196, 197, 198, 199, 200, 201, 398/135, 136, 137, 158, 159, 79, 33, 38
See application file for complete search history.

(56) References Cited

OTHER PUBLICATIONS

K. Padmaraju et al., "Wavelength Locking and Thermally Stabilizing Microring Resonators Using Dithering Signals," IEEE Journal of Lightwave Technology, vol. 32, No. 3, Feb. 2014.
U.S. Appl. No. 18/128,948, filed Mar. 30, 2023 Entitled "Circuits and Methods for Wavelength Locking of Optical Receiver WDM Filters".
Ping-Chuan Chiang, et al., "Ring Modulator Heater Calibration and Control Design Document", Xilinx 2018.

\* cited by examiner

```
┌─────────────────────────────────────────────────────────┐
│  TRANSMIT A FIRST DATA PATTERN TO AN OPTICAL MODULATOR  │
│         DEVICE OF THE OPTOELECTRONIC DEVICE             │╲
└─────────────────────────────────────────────────────────┘ 605
                            │
┌─────────────────────────────────────────────────────────┐
│ DETERMINE, WHILE TRANSMITTING THE FIRST DATA PATTERN    │
│ AND FOR EACH HEATER CONTROL VALUE OF A PLURALITY OF     │
│ HEATER CONTROL VALUES FOR A HEATER FOR THE OPTICAL      │
│ MODULATOR DEVICE, A PHOTODIODE CURRENT VALUE            │
│ ASSOCIATED WITH THE OPTICAL MODULATOR DEVICE TO         │
│ GENERATE A PLURALITY OF PHOTODIODE CURRENT VALUES       │
│ CORRESPONDING TO THE PLURALITY OF HEATER CONTROL        │
│                      VALUES                            │╲
└─────────────────────────────────────────────────────────┘ 610
                            │
┌─────────────────────────────────────────────────────────┐
│  DETERMINE A MAXIMUM OPTICAL MODULATION AMPLITUDE       │
│  FOR THE OPTICAL MODULATOR DEVICE BASED AT LEAST IN     │
│  PART ON THE PLURALITY OF PHOTODIODE CURRENT VALUES     │
│  CORRESPONDING TO THE PLURALITY OF HEATER CONTROL       │
│                      VALUES                             │╲
└─────────────────────────────────────────────────────────┘ 615
                            │
┌─────────────────────────────────────────────────────────┐
│  CONTROL THE HEATER FOR THE OPTICAL MODULATOR DEVICE    │
│  BASED AT LEAST IN PART ON THE MAXIMUM OPTICAL          │
│  MODULATION AMPLITUDE DETERMINED FOR THE OPTICAL        │
│                MODULATOR DEVICE.                        │╲
└─────────────────────────────────────────────────────────┘ 620
```

*FIG. 5*

```
┌─────────────────────────────────────────────────────────┐
│  TRANSMIT A PLURALITY OF DATA PATTERNS TO AN OPTICAL    │
│  MODULATOR DEVICE OF A PLURALITY OF OPTICAL MODULATOR   │
│  DEVICES OF THE OPTOELECTRONIC DEVICE                   │
└─────────────────────────────────────────────────────────┘ ─ 705
                            │
┌─────────────────────────────────────────────────────────┐
│  DETERMINE A PLURALITY OF OPTICAL POWER VALUES FOR THE  │
│  PLURALITY OF DATA PATTERNS, EACH TRANSMITTER DATA      │
│  PATTERN OF THE PLURALITY OF DATA PATTERNS              │
│  CORRESPONDING TO ONE OF THE PLURALITY OF OPTICAL       │
│  POWER VALUES                                           │
└─────────────────────────────────────────────────────────┘ ─ 710
                            │
┌─────────────────────────────────────────────────────────┐
│  DETERMINE A MAXIMUM OPTICAL MODULATION AMPLITUDE       │
│  FOR THE OPTICAL MODULATOR DEVICE BASED AT LEAST IN     │
│  PART ON THE PLURALITY OF OPTICAL POWER VALUES          │
└─────────────────────────────────────────────────────────┘ ─ 715
                            │
┌─────────────────────────────────────────────────────────┐
│  CONTROL A HEATER FOR THE OPTICAL MODULATOR DEVICE      │
│  BASED AT LEAST IN PART ON THE MAXIMUM OPTICAL          │
│  MODULATION AMPLITUDE DETERMINED FOR THE OPTICAL        │
│  MODULATOR DEVICE                                       │
└─────────────────────────────────────────────────────────┘ ─ 720
```

METHODS AND APPARATUSES FOR MAXIMIZING OUTPUT MODULATION AMPLITUDE FOR OPTICAL WAVELENGTH DIVISION MULTIPLEXED MICRO-RING MODULATORS

GOVERNMENT RIGHTS

This invention was made with U.S. Government support under Agreement No. HR0011-19-3-0004, awarded by Defense Advanced Research Projects Agency. The U.S. Government has certain rights in the invention.

TECHNICAL FIELD

Examples of the present disclosure generally relate to controlling output modulation amplitude for optoelectronic devices, for example methods and apparatuses for maximizing the output modulation amplitude for wavelength division multiplexed micro-ring modulators.

BACKGROUND

The growing demand of bandwidth in modern high-speed communication in conjunction with the slowing down of Moore's Law, requires new technology and innovative techniques in circuit design to meet current challenges in datacenters, supercomputers and other applications. Integrated high-speed silicon-photonics devices such as ring modulators, cascade ring resonators, and Zehnder Interferometers have the characteristics to meet this high bandwidth demand due to their energy efficient, and ability to be used in dense wavelength division multiplexing (WDM) systems. However, such integrated high-speed silicon-photonics devices may be highly sensitive to process and temperature variations, causing poor performance. For example, sensitivity of resonance wavelengths due to process variations and temperature drift results in transmission loss of the wanted optical signal amplitude. For at least these reasons, improved techniques for maximizing output modulation amplitude in optoelectronic devices are desired.

SUMMARY

Some examples described herein provide for controlling output modulation amplitude for optoelectronic devices, for example methods and apparatuses for maximizing the output modulation amplitude for wavelength division multiplexed micro-ring modulators.

An example of the present disclosure is a method of operating an optoelectronic device. The method includes transmitting a first data pattern to an optical modulator device of the optoelectronic device. The method also includes determining, while transmitting the first data pattern and for each heater control value of a plurality of heater control values for a heater for the optical modulator device, a photodiode current value associated with the optical modulator device to generate a plurality of photodiode current values corresponding to the plurality of heater control values. The method also includes determining a maximum optical modulation amplitude for the optical modulator device based at least in part on the plurality of photodiode current values corresponding to the plurality of heater control values. The method also includes controlling the heater for the optical modulator device based at least in part on the maximum optical modulation amplitude determined for the optical modulator device.

Another example of the present disclosure is a method of operating an optoelectronic device. The method includes transmitting a plurality of data patterns to an optical modulator device of a plurality of optical modulator devices of the optoelectronic device. The method also includes determining a plurality of optical power values for the plurality of data patterns, each transmitter data pattern of the plurality of data patterns corresponding to one of the plurality of optical power values. The method also includes determining a maximum optical modulation amplitude for the optical modulator device based at least in part on the plurality of optical power values. The method also includes controlling a heater for the optical modulator device based at least in part on the maximum optical modulation amplitude determined for the optical modulator device.

Another example of the present disclosure is an optoelectronic device. The optoelectronic device includes an optical modulator device. The device also includes a heater thermally coupled with the optical modulator device. The device also includes a photodiode associated with the optical modulator device. The device also includes control circuitry coupled with the heater and the photodiode, the control circuitry to: transmit a first data pattern to the optical modulator device; determining, while transmitting the first data pattern and for each heater control value of a plurality of heater control values for the heater, a photodiode current value for the photodiode to generate a plurality of photodiode current values corresponding to the plurality of heater control values; determine a maximum optical modulation amplitude for the optical modulator device based at least in part on the plurality of photodiode current values corresponding to the plurality of heater control values; and control the heater based at least in part on the maximum optical modulation amplitude determined for the optical modulator device.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Some examples described herein provide for controlling output modulation amplitude for optoelectronic devices, for example methods and apparatuses for maximizing the output modulation amplitude for wavelength division multiplexed micro-ring modulators (MRMs).

Integrated high-speed silicon-photonics devices may be highly sensitive to process and temperature variations, causing poor performance. For example, sensitivity of resonance wavelengths due to process variations and temperature drift results in transmission loss of the wanted optical signal amplitude in photonic or optoelectronic devices, including those containing optical modulation devices. Improved techniques for maximizing output modulation amplitude in optoelectronic devices are desired.

Methods and apparatuses for controlling output modulation amplitude for optoelectronic devices are disclosed. In one or more embodiments, temperature tracking techniques are disclosed, where control circuitry is used to determine a maximum optical modulation amplitude, then control a set of heaters for a set of optical modulator devices, each heater associated with one of the optical modulator devices. In some embodiments, the control circuitry operates to wavelength lock the optical modulator device by sending different data patterns through a transmitter for the optical modulator device to find a maximum optical modulation amplitude. In some embodiments, a transimpedance amplifier (TIA) direct current (DC) loop, which includes at least portions of the control circuitry, is used by the control circuitry to quantize a DC current the input from a photodiode. This DC current information for different data patterns are used by the control circuitry to find the maximum output modulation amplitude. The maximum output modulation amplitude can be used to control the heater during operation.

The embodiments described herein provide advantages over existing techniques. One advantage includes that methods and apparatuses described herein have a relatively smaller footprint and load than current approaches (e.g., over sample-and-hold techniques). Another advantage includes implementation to provide for optical transceivers operating at high data rates, for example about 56 gigabits per second, or more. Another advantage includes compensating for process variations and temperature drift that can result in transmission loss of the wanted optical signal amplitude, and techniques described herein may have relatively lower thermal, process, and input power sensitivity than existing techniques. Another advantage is increased precision of control of the resonance wavelength of the optical modulator device, for example regardless of temperature and optical power variations experienced by the optical modulator device.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

Figure 1:
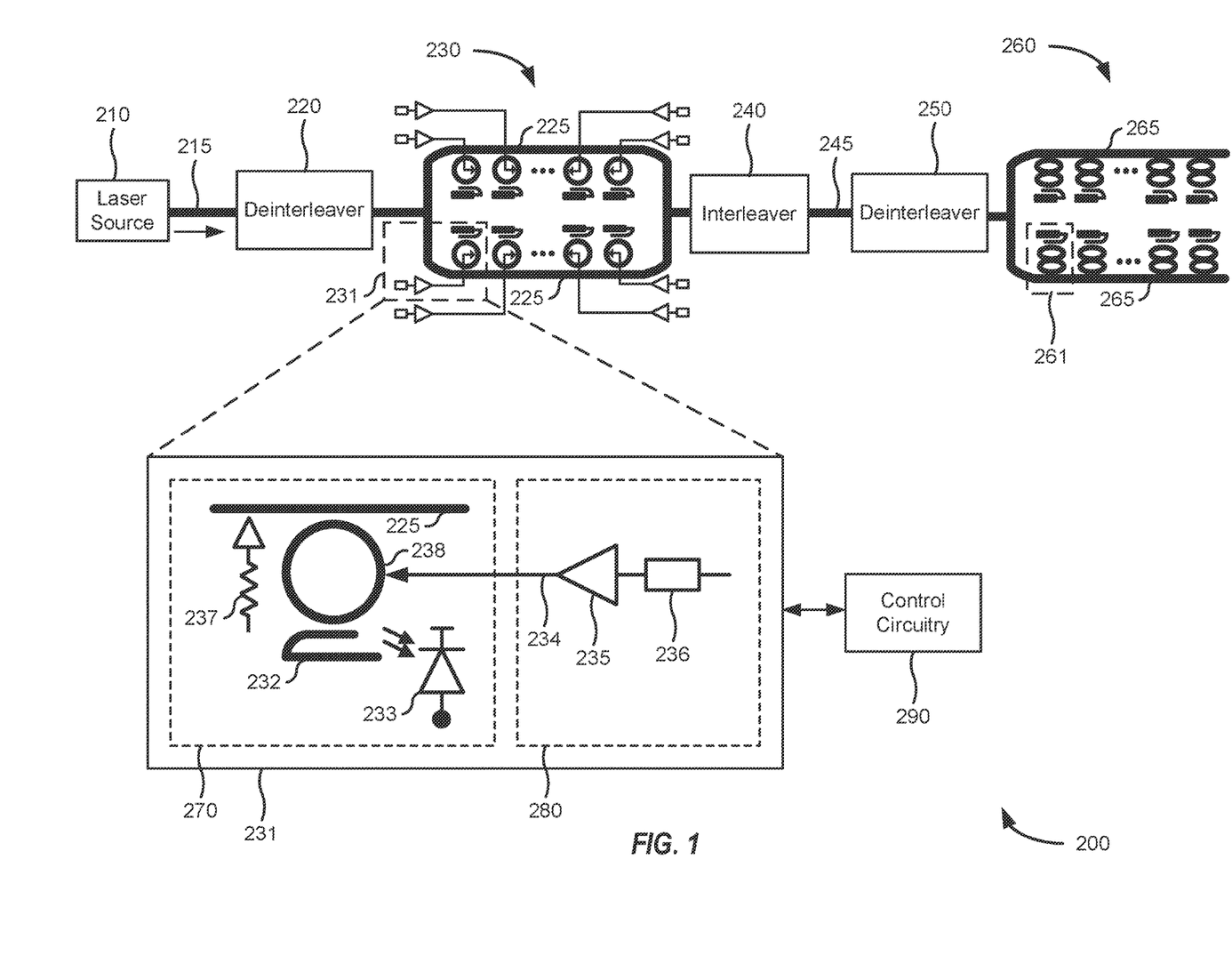
FIG. 1 is a block diagram depicting a photonic communications system, according to an example.

FIG. 1 is a block diagram depicting a photonic communications system 200, according to an example. Photonic communications system 200 includes a laser source 210, a deinterleaver 220, a set of optical modulator blocks 230, an interleaver 240, a deinterleaver 150, and a set of optical demodulator blocks 260.

Laser source 210 generates carrier waves 215 (carrier signals), for example 4, 8, 16, or 32 carrier waves. Each carrier wave is associated with a particular wavelength ($\lambda$), which may be denoted $\lambda n$ for a particular carrier wave, where n=1, 2, 3, . . . . The carrier wave may additionally or alternatively be identified by its frequency (e.g., in gigahertz (GHz)). In one or more embodiments, the carrier waves have a regular wavelength or frequency separation (e.g., each carrier wave separated from the next carrier wave by 100 GHz).

Deinterleaver 220 separates carrier waves 215 into two or more sets of carrier waves 225. In one or more embodiments, deinterleaver 220 separates carrier waves 215 into two sets of carrier waves 225. In an example where carrier waves 215 includes sixteen individual carrier waves, each set of carrier waves can include eight carrier waves. For example, where carrier waves 215 include sixteen individual carrier waves each separated by 100 GHz, a first set of carrier waves 225 can include eight carrier waves, each separated by 200 GHz, and a second set of carrier waves 225 can include another eight carrier waves, each separated by 200 GHz. In one or more embodiments, deinterleaver 220 is a Mach-Zehnder interferometer based (MZI-based) deinterleaver.

The set of optical modulator blocks 230 receive the two or more sets of carrier waves 225. Each optical modulator block 231 of the set of optical modulator blocks 230 is configured to operate with one of the carrier waves of the carrier waves 215 generated by the laser source 210. For example, if there are thirty-two carrier waves in carrier wave 215, the set of optical modulator blocks 230 contains thirty-two of optical modulator blocks 231.

Each optical modulator block 231 includes an optical modulator device 238 thermally coupled with a heater 237, a drop port 232 optically coupled with the optical modulator device 238 and a photodiode 233, a driver 235 to provide a drive signal 234 to the optical modulator device 238, and a digital signal source 236 to provide the digital signal used to drive the optical modulator device 238. Digital signal source 236 provides a signal (e.g., data) used to modulate the one of the carrier waves 215 associated with optical modulator block 231, such that following modulation of the carrier wave by the optical modulator block 231, the carrier wave will optically carry the signal provided by the digital signal source 236. The set of optical modulator blocks 230 will thus modulate the carrier waves 215 with a set of signals, each carrier wave carrying one of the signals of the set of signals, collectively a WDM signal.

In one or more embodiments, the optical modulator block 231 is divided into photonic circuitry 270 and electrical circuitry 280. For example, in some embodiments, the photonic circuitry 270 are at least a portion of one or more photonic integrated circuits and the electrical circuitry 280 are at least a portion of an electrical integrated circuit. In other embodiments, the photonic circuitry 270 and the electrical circuitry 280 are different portions of a single integrated circuit or different integrated circuits of a single integrated circuit system or assembly.

Each optical modulator block 231 is communicatively coupled with control circuitry 290, which may be or be referred to as a controller in some embodiments. In one or more embodiments, the control circuitry 290 is colocated with (e.g., on a same integrated circuit with, or within a same integrated system or assembly as) the electrical circuitry

280. In one or more embodiments, the control circuitry 290 is separate from the electrical circuitry 280 (e.g., on different integrated circuits, on different integrated systems or assemblies, or on different integrated circuits but within a same integrated system or assembly).

Following the set of optical modulator blocks 230, the two or more sets of carrier waves 225 are received at interleaver 240, which combines the two or more sets of carrier waves 225 into a single WDM signal 245. In one or more embodiments, the carrier waves of the single WDM signal 245 have a regular wavelength or frequency separation (e.g., each carrier wave separated from the next carrier wave by 100 GHZ). In one or more embodiments, the WDM signal 245 is carried by a waveguide, either on-chip or off-chip (e.g., between chips or assemblies). In some embodiments, the WDM signal 245 is carried by an on-chip waveguide of a photonic integrated circuit, for example, the on-chip waveguide of the photonic integrated circuit containing the photonic circuitry 270. In one or more embodiments, interleaver 240 is a Mach-Zehnder interferometer based (MZI-based) interleaver.

The WDM signal 245 is received at a deinterleaver 250 that separates the WDM signal 245 into two or more sets of modulated carrier waves 265. A set of optical demodulator blocks 260 demodulates the two or more sets of modulated carrier waves to extract the signals that were modulated onto the carrier waves at the set of optical modulator blocks 230.

As further described herein, one or more embodiments can be implemented in photonic communications system 200, including circuits (devices, including optoelectronic devices) and algorithms (methods, processes, operations or sets of operations) that increase or maximize a ring modulator output optical signal (e.g., an output optical signal for one or more optical modulator blocks 231) by controlling its temperature (e.g., via heater 237) and locking it to maximum optical modulation amplitude (OMA) for each transmitter lane (e.g., each carrier wave of carrier waves 215) for a WDM optical link (e.g., WDM signal 245). Examples of one or more embodiments can be implemented to provide for optical transceivers operating at high data rates, for example about 56 gigabits per second, or more. In one or more examples, the laser source 210, which is an external laser source in one or more embodiments, generates sixteen carrier waves, each carrier wave having a wavelength, $\lambda n$, that resonates with a corresponding resource wavelength of an optical modulator device (e.g., an MRM resonance wavelength), for example an optical modulator device 238 of optical modulator block 231, that allows transmission and reception of about 1 terabyte of data, or more, for a 16-$\lambda$ laser source.

In one or more embodiments, a resonance frequency of an optical modulator device (e.g., MRMs resonance frequency) depend on (e.g., are highly sensitive to) process and temperature variation. Sensitivity of resonance wavelength due to process variations and temperature drift can result in transmission loss of the wanted optical signal amplitude. For example, a resonance wavelength shift due to temperature variation can result in dramatically different transmitted eye diagram. One or more embodiments described herein avoid optical amplitude fluctuation due to thermal, process, and input power sensitivity, and increase the ability to be used in practical applications by allowing the determination and control (e.g., precise control) of a resonance wavelength of the optical modulator device, for example regardless of temperature and optical power variations experienced by the optical modulator device.

According to one or more temperature tracking techniques, a maximum Optical Modulation Amplitude (OMA) is calculated using sample-and-hold logic to integrate optical power when sending different data patterns. Although this approach can work, such approach has disadvantages. First, an OMA calculation using a sample-and-hold circuit relies on several analog blocks including comparators, capacitors, reference digital-to-analog converters (DACs), unity-gain amplifiers, OTAs, and offset cancellation circuits that are large in their area usage. Second, such sample-and-hold circuits may have a limited input power range. For example, when the laser power is low, the OMA detection can become difficult because the low photocurrent from the photodiode 133 may not have enough time to charge even the parasitic sampling capacitor. On the other hand, when the optical power is relatively larger, a relatively larger capacitor is needed to handle the relatively large photocurrent which consumes a large area and can increase the parasitic capacitance. Since the optical power to the MRM can vary significantly, selecting a proper programmable capacitance value requires a guess work unless additional circuitry to measure the optical power is used. It either leads to suboptimal OMA or circuit complexity that consume more area to implement.

In one or more embodiments, temperature tracking techniques based on calculating a maximum OMA can use the control circuitry 290 (e.g., a digital transmit heater DSP) to perform a maximum OMA calculation. The control circuitry sends a training sequence of different data pattern through the transmitter of the optical modulator block 231 of the set of optical modulator blocks 230, and observes the current modulation power at drop port 232 to calculate the maximum OMA. The modulated photocurrent (Ipd) in the drop port 232 is represented digitally. The maximum optical modulation amplitude (OMA) is computed by calculating the difference of the current digital values for drop port 232 when different transmitter data patterns are provided via the digital signal source 236. The optical power difference between pattern '0000' and '1111' is processed through the control circuitry 290 (e.g., a DSP or DSP block, for example of a controller) to calculate the maximum OMA. In one or more embodiments, this approach reduces the complexity of the circuit and reduces the area.

Figure 2:
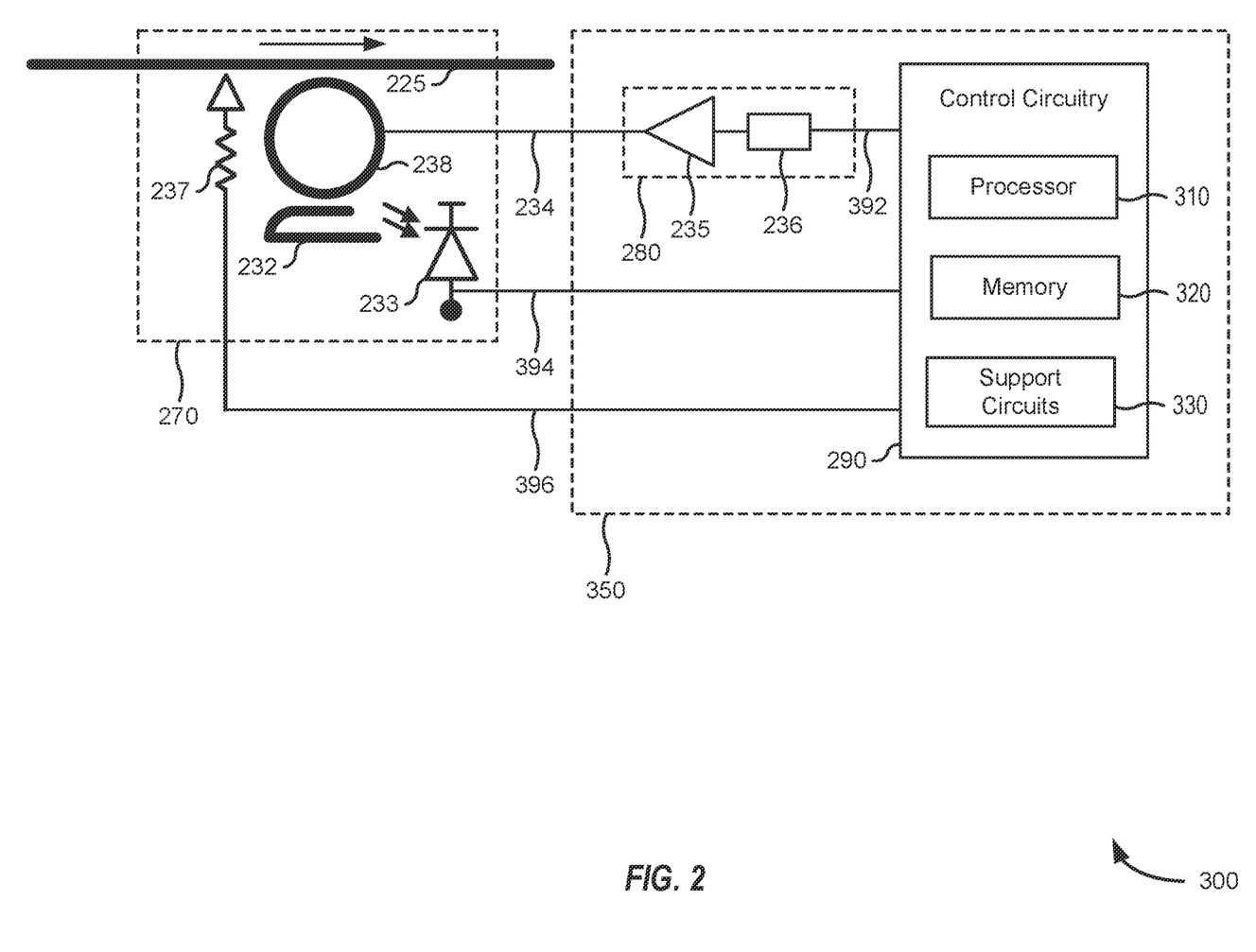
FIG. 2 is a block diagram depicting an optoelectronic device, according to an example.

FIG. 2 is a block diagram depicting an optoelectronic device 300, according to an example. In one or more embodiments, optoelectronic device 300 is an example of at least portions of photonic communications system 200. In one or more embodiments, the optoelectronic device 300 includes photonic circuitry 270 and electrical circuitry 350, which includes both electrical circuitry 280 and control circuitry 290. In one or more embodiments, one or more of the photonic circuitry 270, electrical circuitry 280, or control circuitry 290 are colocated (e.g., on a same integrated circuit with, or within a same integrated system or assembly). In other embodiments, one or more of the photonic circuitry 270, electrical circuitry 280, or control circuitry 290 are separate (e.g., on different integrated circuits, on different integrated systems or assemblies, or on different integrated circuits but within a same integrated system or assembly).

In one or more embodiments, control circuitry 290 of the optoelectronic device 300 includes a processor 310, a memory 320, and support circuits 330. In some embodiments, control circuitry 290 is or includes a DSP. Control circuitry 290, including one or more of the processor 310, memory 320, or support circuits 330 can perform one or more operations of methods described herein.

The processor 310 (e.g., DSP) is operable with memory 320 (e.g., non-volatile memory) and support circuits 330. The support circuits 330 (e.g., one or more cache, clock circuit, input/output subsystem, power supply (e.g., current source, voltage source), digital-to-analog converter (DAC) (e.g., current DAC (IDAC), voltage DAC (VDAC)), analog-to-digital converter (ADC), voltage controlled oscillator (VCO), multiplexer (MUX), demultiplexer (deMUX), flip-flop (FF), etc., and combinations thereof) are conventionally coupled to the processor 310 and coupled to the various other components of the optoelectronic device 300 or photonic communications system 200.

In one or more embodiments, the processor 310 is any circuitry sufficient to implement the features (processes, operations, methods) described herein, such as an application-specific integrated circuit (ASIC), a DSP, or a field-programmable gate array (FPGA) (e.g., an FPGA programmed according to register-transfer level (RTL) implementing features described herein). In some embodiments, the processor 310 is one of any form of general-purpose computer processor used in connection with optical communications equipment, such as a programmable logic controller (PLC), for controlling system components and sub-processors.

The memory 320, coupled to the processor 310, is non-transitory and is typically one or more of readily available memory such as random access memory (RAM), read only memory (ROM), floppy disk drive, hard disk, or any other form of digital storage, local or remote.

In one or more embodiments, the memory 320 is in the form of a computer-readable storage media containing instructions (e.g., non-volatile memory), that when executed by the processor 310, facilitates the operation of the optoelectronic device 300 or photonic communications system 200. The instructions in the memory 320 is in the form of a program product such as a program that implements the methods of the present disclosure (e.g., middleware application, equipment software application, etc.). The program code may conform to any one of a number of different programming languages. In one example, the disclosure may be implemented as a program product stored on computer-readable storage media for use with a computer system. The program(s) of the program product define functions of the embodiments (including the methods described herein). Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the methods described herein, are embodiments of the present disclosure.

Figure 3:
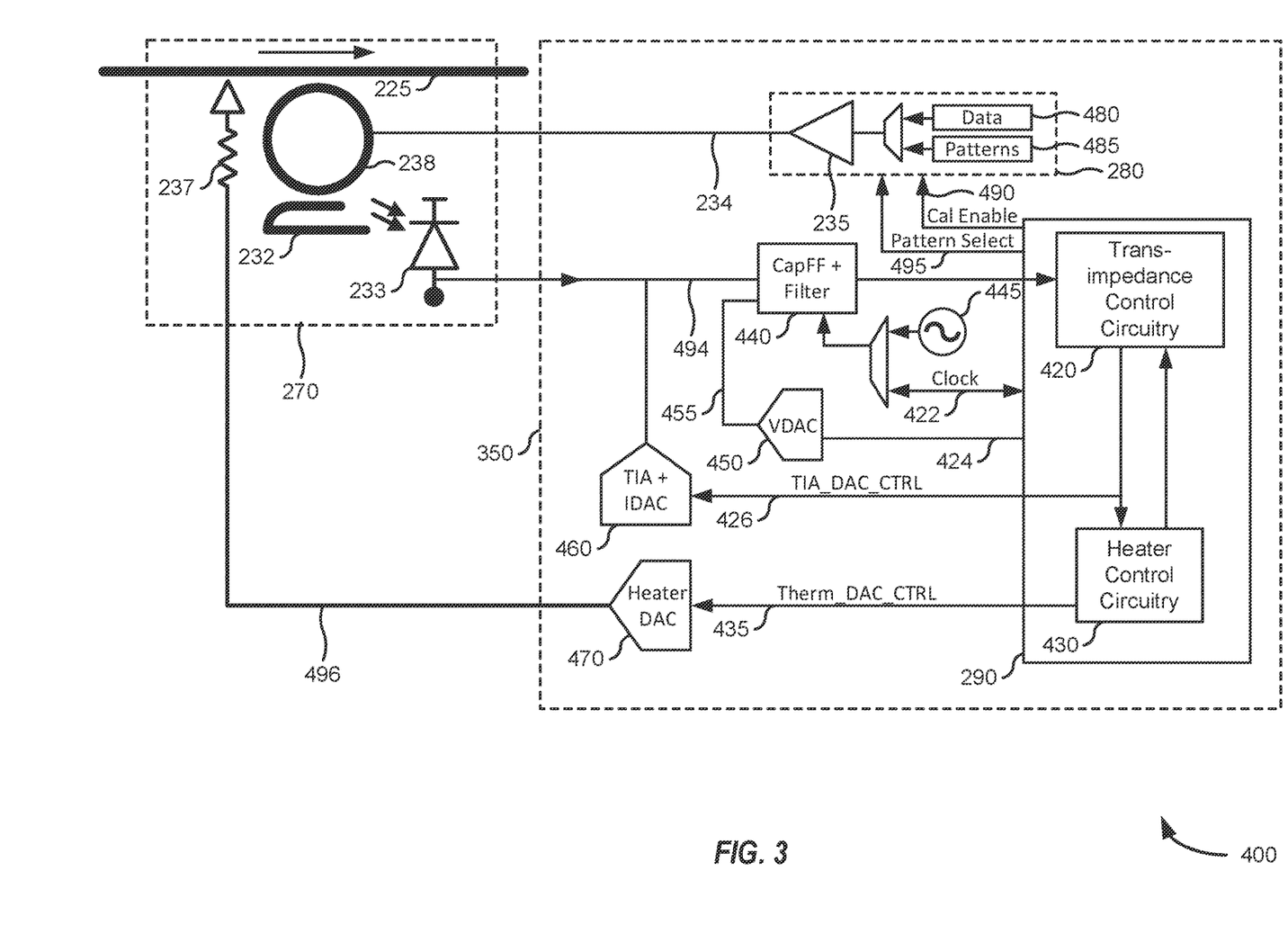
FIG. 3 is a block diagram depicting an optoelectronic device, according to an example.

FIG. 3 is a block diagram depicting an optoelectronic device 400, according to an example. In one or more embodiments, optoelectronic device 400 is an example of at least portions of photonic communications system 200, optoelectronic device 300, or both. In one or more embodiments, the optoelectronic device 400 includes photonic circuitry 270 and electrical circuitry 350, which includes both electrical circuitry 280 and control circuitry 290. In one or more embodiments, one or more of the photonic circuitry 270, electrical circuitry 280, or control circuitry 290 are colocated (e.g., on a same integrated circuit with, or within a same integrated system or assembly). In other embodiments, one or more of the photonic circuitry 270, electrical circuitry 280, or control circuitry 290 are separate (e.g., on different integrated circuits, on different integrated systems or assemblies, or on different integrated circuits but within a same integrated system or assembly).

Optoelectronic device 400 is a top-level diagram of a temperature tracking system. In one or more embodiments, electrical circuitry 350 includes transimpedance control circuitry 420, heater control circuitry 430, a capacitor flip-flop (CapFF) 440, a clock source 445 (e.g., an uncorrelated voltage-controlled oscillator (VCO) clock), a VDAC 450, a transimpedance amplifier (TIA) and IDAC 460, and a heater DAC 470.

The photonic circuitry 270 (e.g., a photonic integrated circuit (PIC)) is the optical block for which temperature tracking and wavelength locking for maximizing the transmitter OMA is to performed. The electrical circuitry 350 (e.g., an electrical integrated circuit (EIC)) includes an exemplary design that can wavelength lock an optical signal (e.g., a carrier wave of carrier waves 225) and track temperature variation. The heater 237 (e.g., a heater resistor $R_{heat}$) warms up the optical modulator device 238 (e.g., a MRM filter) to control the temperature, and thus the wavelength, of the optical modulator device 238. In one or more embodiments, the output DC current (e.g., $I_{PD}$) of the photodiode 133 is a function of the wavelength offset of the optical modulator device 238, transmitter modulation power, and laser input power. The output DC current (e.g., $I_{PD}$) of the photodiode 133 changes the DC output voltage of the TIA and IDAC 460, which is $V_{pd}$. A digital TIA DC loop including CapFF 440 (using the output of VDAC 450 that provides a reference voltage 355 ($V_{cm}$) based on a reference voltage control signal 424 (e.g., from the control circuitry 290, such as an 8-bit value specifying $V_{cm}$), and clocked according to clock source 445 and the system clock 422), transimpedance control circuitry 420, and TIA and IDAC 460 measures the photodiode voltage ($V_{pd}$) for photodiode 133 (TIA DC output 494), and adjusts the TIA IDAC code 426 (TIA_DAC_CTRL) to cancel the $I_{pd}$ to stabilize the TIA DC output voltage at the reference voltage $V_{cm}$. The TIA IDAC code reflects the value of $I_{PD}$, and thus the optical power that the throughput transmits.

The magnitude of $I_{PD}$ (TIA_DAC_CTRL) for each heater code 435 (e.g., Therm_DAC_CTRL) is calculated for different data patterns 485. In one or more embodiments, a first data pattern is all 0s (e.g., pat_00 (0000 . . . )), a second data pattern is alternating 0s and 1s (e.g., pat_10 (1010 . . . )), and a third data pattern is all 1s (e.g., pat_11 (11111 . . . )). For each heater DAC 470 (e.g., each optical modulator block 231 may have its own one or more heater DACs), the control circuitry 290 (e.g., of a DSP) first finds IDAC values for DC balance data before switching from using data 480 to drive the optical modulator device 138 to using data patterns 485 to drive the optical modulator device 138, for example from data to all 0s or 1s to minimize self-heating. After switching, data patterns 485 (e.g., static 1s or 0s) are used for a short period of time to compute their perspective optical power at that thermal DAC value (e.g., heater code 435). Then, the heater control circuitry 430 computes the difference between pattern 1 and 0 to compute an OMA until heater control circuitry 430 exhausts all the thermal DAC range. Once the maximum OMA is found, transimpedance control circuitry 420 freezes (sets, defines) the corresponding TIA and IDAC 460 and tracks the laser wavelength fluctuation due to temperature drift.

In one or more embodiments, optoelectronic device 400 includes a temperature controller circuit for maximizing an optical amplitude of an optical modulator device (e.g., MRM). The TIA DC loop adjusts the TIA IDAC value to cancel the photo diode output DC current, $I_{PD}$, such that the TIA DC voltage is equal to the reference voltage $V_{cm}$. The PD output DC current, $I_{PD}$, is a function of the filter's wavelength offset $f_{os}$, the optical input power and the transmitter data pattern. During calibration, the control circuitry 290 (e.g., a TX heater DSP) sends different data patterns (101010 . . . or 00000 . . . , or 1111 . . . ) for each thermal DAC in a given timing range. By sweeping the heater code 435 (e.g., Therm_DAC_CTRL) and observing the TIA IDAC code for different data patterns, the control circuitry 290 (e.g., heater control circuitry 430, which may also be or be referred to as heater RTL or heater DSP in some examples) computes the corresponding output power difference. The control circuitry 290 (e.g., heater control circuitry 430) computes the power difference for all possible heater DAC values and freezes the TIA IDAC value that corresponds to the maximum OMA. Once the maximum OMA is calculated and the TIA DAC is frozen, calibration is done and the control circuitry 290 (e.g., heater control circuitry 430) may only adjust the heater DAC 470 to monitor and calibrate the wavelength drift due to temperature variation.

The operations of the photonic communications system 200, optoelectronic device 300, and/or optoelectronic device 400 include the following operations.

In one or more embodiments, a first operation includes the TIA DC loop (e.g., at least a loop including CapFF 440, transimpedance control circuitry 420, and TIA and IDAC 460) biases the TIA DC output 394 to $V_{pd}$ by tuning the TIA IDAC code 326, and the TIA IDAC code 326 represents DC power at the drop-port 232.

In one or more embodiments, a second operation includes, for each heater code 335 (e.g., Therm_DAC_CTRL), which may also be referred to as a thermal code, three corresponding TIA IDAC codes 326 are identified (e.g., by control circuitry 290, or a component thereof, such as processor 310, transimpedance control circuitry 420, and/or heater control circuitry 430). In order to reduce self-heating effect, a 10101 pattern (e.g., via data patterns 485) is sent. In one or more embodiments, use of data patterns 485 are enabled by control circuitry 290 using an enable signal 490 (e.g., Cal_Enable) and the specific data pattern selected by control circuitry 290 using a pattern select signal 495 (e.g., Pattern_Select). The 10101 pattern is locked to a corresponding TIA IDAC code 426 for several clock cycles. Once we have the TIA DAC code DC balance data, the control circuitry 290 instructs the transmitter (e.g., driver 235) to send all 1s (using a pattern select signal 495). Control circuitry 290 calculates a corresponding TIA DAC (say, TIA_1s) for the same thermal DAC value 496 (e.g., set by heater DAC 470 based on heater code 435 (e.g., Therm_DAC_CTRL)). Control circuitry 290 does the same calculation for all 0s data pattern (say, TIA_0s). And finally, control circuitry 290 calculates the corresponding OMA for this thermal DAC by subtracting the two (TIA_1s-TIA_0s).

In one or more embodiments, a third operation includes exhausting (e.g., by control circuitry 290) all the heater codes 435 (e.g., all values of Thermal DAC CTRL) and keeping (e.g., by control circuitry 290) the maximum OMA heater DAC and IDAC values corresponding to the maximum OMA heater DAC.

In one or more embodiments, a fourth operation includes performing (e.g., by control circuitry 290) continuous temperature tracking and wavelength locking by tuning the heater code 435 (e.g., a heater DAC code).

Figure 4:
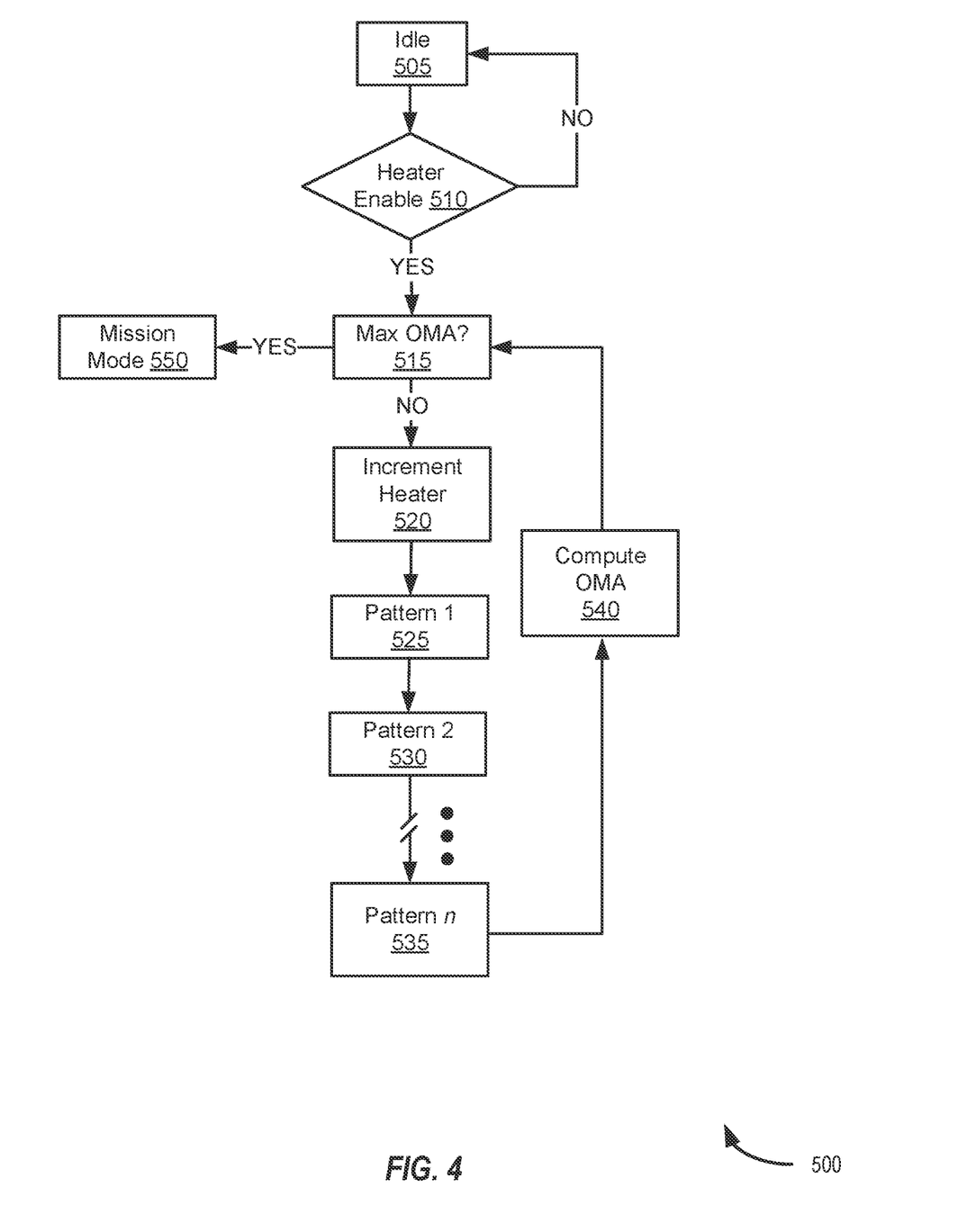
FIG. 4 is flow diagram of a method of operating an optoelectronic device, according to some examples.

FIG. 4 is flow diagram of a method 500 for operating an optoelectronic device, according to some examples. In one or more embodiments, the operations described with reference to method 500 are performed by one or more components of the photonic communications system 200, optoelectronic device 300, or optoelectronic device 400, such as control circuitry 290, processor 310, memory 320, support circuits 330, transimpedance control circuitry 420, and/or heater control circuitry 430.

In one or more embodiments, method 500 (process, algorithm, operations) includes multiple sets of operations (phases). For example, these operations can include at least a heater search range initialization and an OMA search At operation 505, the optoelectronic device is in an idle or sleep state.

At operation 510, the heater (e.g., including heater control circuitry 430) is enabled. In one or more embodiments, the heater IDAC (e.g., TIA and IDAC 460) has a relatively large tuning range. Therefore, the control circuitry 290 (heater control circuitry 430) limits the initial heater IDAC search range to about 200 GHz is given to find the filter peak, for example based on IDAC values versus heater code 335 (e.g., Therm_DAC_CTRL). In some examples, the filter center falls out of this range, so the filter may lock to its next wavelength. As a result, all the filters are shifted by one channel (carrier wave), and consumes additional power in some case (e.g., up to about 5 milliWatts per channel).

Therefore, the control circuitry 290 first detects if the TIA IDAC code at the beginning of the search range is above a threshold. If it is higher than the threshold, the control circuitry 290 decreases the upper and the lower end of the search range, until control circuitry 290 finds the TIA IDAC code is lower than the threshold. In some examples, this ensures that the initial point of the search range is at the left side of the center, so the filter center can always be covered.

During the filter initialization, the heater code 435 (e.g., Therm_DAC_CTRL) is swept from end to start (e.g., prog_heater_end and prog_heater_start) or start to end (e.g., prog_heater_start and prog_heater_end). If all the TIA IDAC is lower than the minimum threshold, a channel missing flag will be declared. Otherwise, the filter calibration will start.

At operation 514, the control circuitry 290 determines whether the maximum OMA has been found.

If not (e.g., if just starting the search), the control circuitry 290 proceeds to operation 520. In one or more embodiments, for operations 520, 525, 530, 535 control circuitry 290 searches for the heater code (e.g., heater code 435) that would give us the maximum transmitter OMA by sweeping the heater code 335 (e.g., Thermal_DAC_CTRL) as from prog_heater_end to prog_heater_start.

At operation 520, the control circuitry 290 increments the heater (e.g., increments the heater code 335).

At operation 525, operation 530, and operation 535, the control circuitry 290 (e.g., TX heater DSP) communicates to the data path to send different data patterns for each Thermal DAC and computes their corresponding digital representation of IDAC. In one or more embodiments, the control circuitry 290 uses an enable signal 490 (e.g., Cal_Enable) and a pattern select signal 495 (e.g., Pattern_Select) to control the data path to send a specific data pattern to the optical modulator device 238 via driver 235 provide a drive signal 234 based on the selected pattern.

At operation 525, a first data pattern is sent. In some embodiments, control circuitry 290 first finds its corresponding digital representation with a DC balance data pattern (10101 . . . ).

At operation 530, a second data pattern is sent. In some embodiments, control circuitry 290 then causes a static 1 to be sent, followed by control circuitry 290 calculating the corresponding IDAC value (Idac_11n).

At operation 535, a subsequent operation includes a third data pattern to be sent. In some embodiments, control circuitry 290 then causes static 0s to be sent rather than 1s and computes Idac_00n. In some examples, one or more additional data patterns (e.g., a fourth data pattern, fifth data pattern, and so on) can be sent, and corresponding IDAC value computed, consistent with the disclosure herein.

At operation 540, for the nth thermal DAC, control circuitry 290 computes the OMA (OMA_n=Idac_11n−Idac_00n), and compares the computed OMA with the stored OMA_max value.

Returning to operation 514, control circuitry 290 will continue the loop including operation 520, operation 425, operation 430, operation 435, and operation 440 until the minimum heater setting (prog_heater_start) is reached based on the incrementing at operation 420. In one or more embodiments, control circuitry 290 only keeps the maximum OMA settings.

At operation 550, once the maximum OMA is obtained and heater incremented, control circuitry 290 asserts a calibration done signal so that the transmitter can be in a normal data transmission (mission) mode. In one or more embodiments, asserting the calibration done signal includes the control circuitry 290 signaling, via enable signal 490 (e.g., Cal_Enable), for the electrical circuitry 280 to select to obtain data 480 (e.g., rather than data patterns 485) for driver 135 to use to supply a drive signal 234 to the optical modulator device 238.

Figure 5:
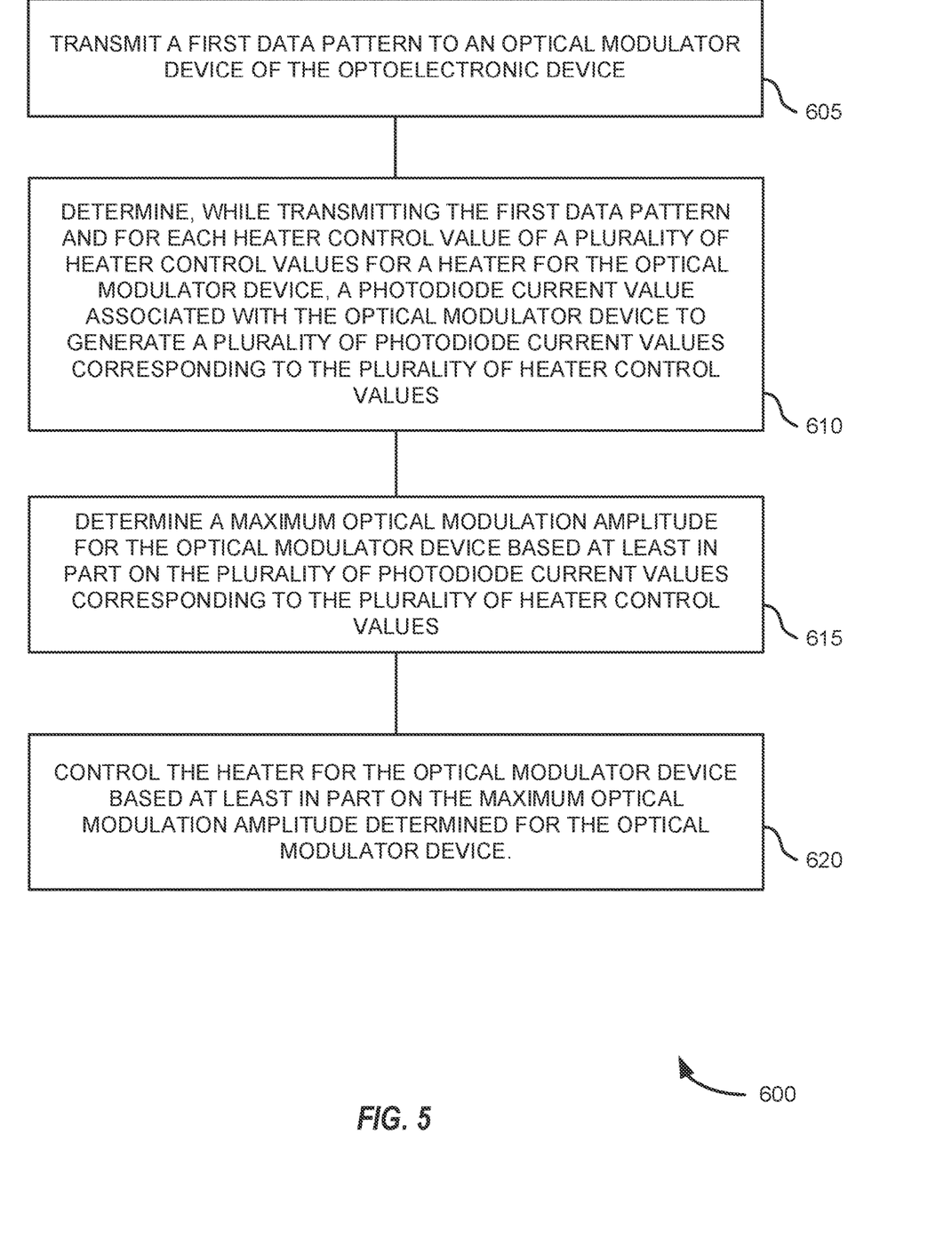
FIG. 5 is flow diagram of a method of operating an optoelectronic device, according to some examples.

FIG. 5 is flow diagram of a method 600 of operating an optoelectronic device, according to some examples. In one or more embodiments, the optoelectronic device is an example of at least portions of an optical modulator block 231 of a set of optical modulator blocks 230, and control circuitry 290.

At operation 605, the method includes transmitting a first data pattern to an optical modulator device of the optoelectronic device.

At operation 610, the method includes determining, while transmitting the first data pattern and for each heater control value of a plurality of heater control values for a heater for the optical modulator device, a photodiode current value associated with the optical modulator device to generate a plurality of photodiode current values corresponding to the plurality of heater control values.

At operation 615, the method includes determining a maximum optical modulation amplitude for the optical modulator device based at least in part on the plurality of photodiode current values corresponding to the plurality of heater control values.

At operation 620, the method includes controlling the heater for the optical modulator device based at least in part on the maximum optical modulation amplitude determined for the optical modulator device.

In one or more embodiments, the method further includes transmitting a second data pattern to the optical modulator device, wherein the maximum optical modulation amplitude is determined based at least in part on both the first data pattern and the second data pattern.

In one or more embodiments, the first data pattern is a series of consecutive "O" bits, a series of consecutive "1" bits, or a series of alternating "0" bits and "1" bits.

In one or more embodiments, the method further includes identifying that a first heater control value associated with a first photodiode current value in a range of heater control values exceeds a threshold value. The method then includes adjusting the range to determine the plurality of heater control values based at least in part on the range of the heater control values exceeding the threshold value.

In one or more embodiments, the method further includes determining, for each optical modulator device of a plurality of optical modulator devices, a maximum optical modulation amplitude for the optical modulator device, each optical modulator device of the plurality of optical modulator devices associated with a corresponding heater of a plurality of heaters. The method then includes controlling each heater of the plurality of heaters according to the maximum optical modulation amplitude determined for the optical modulator device corresponding to the heater.

In one or more embodiments, controlling the heater for the optical modulator device based at least in part on the maximum optical modulation amplitude determined for the optical modulator device further includes tracking an output value for a photodiode associated with the optical modulator device, and transmitting one or more heater control values to adjust a temperature of the heater. In some embodiments, the one or more heater control values are based at least in part on the tracked output value and the maximum optical modulation amplitude.

In one or more embodiments, the optical modulator device is a silicon micro-ring modulator. In one or more embodiments, the heater is controlled by a digital signal processor.

In one or more embodiments, two or more of operations 605 or 610 are substantially performed concurrently (simultaneously).

Figure 6:
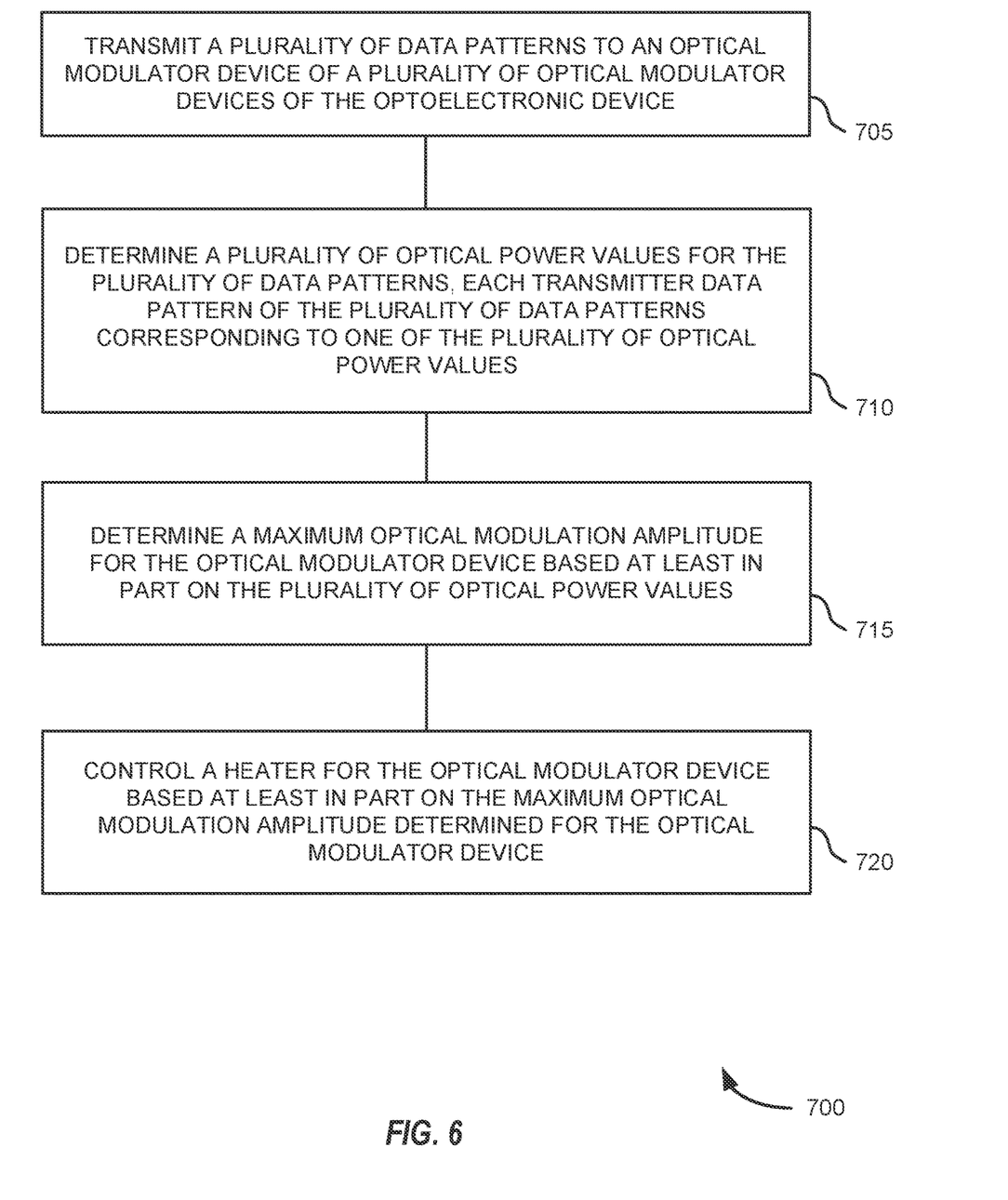
FIG. 6 is flow diagram of a method of operating an optoelectronic device, according to some examples.

FIG. 6 is flow diagram of a method 700 of operating an optoelectronic device, according to some examples. In one or more embodiments, the optoelectronic device is an example of at least portions of an optical modulator block 231 of a set of optical modulator blocks 230, and control circuitry 290.

At operation 705, the method includes transmitting a plurality of data patterns to an optical modulator device of a plurality of optical modulator devices of the optoelectronic device.

At operation 710, the method includes determining a plurality of optical power values for the plurality of data patterns, each transmitter data pattern of the plurality of data patterns corresponding to one of the plurality of optical power values.

At operation 715, the method includes determining a maximum optical modulation amplitude for the optical modulator device based at least in part on the plurality of optical power values.

At operation 720, the method includes controlling a heater for the optical modulator device based at least in part on the maximum optical modulation amplitude determined for the optical modulator device.

In one or more embodiments, the method further includes determining, while transmitting a first data pattern of the plurality of data patterns, and for each heater control value of a plurality of heater control values for the heater, a photodiode current value associated with the optical modulator device to generate a plurality of photodiode current values corresponding to the plurality of heater control values. In some embodiments, the optical power value for the first data pattern is determined based at least in part on the plurality of photodiode current values and the plurality of heater control values corresponding to the plurality of photodiode current values.

In one or more embodiments, at least one of the plurality of data patterns comprises a series of consecutive "0" bits, a series of consecutive "1" bits, or a series of alternating "0" bits and "1" bits.

In one or more embodiments, the method further includes identifying that a first heater control value associated with a first photodiode current value in a range of heater control values exceeds a threshold value. In some embodiments, the method also further includes In one or more embodiments, the method further includes adjusting the range to determine the heater control values based at least in part on the range of the heater control values exceeding the threshold value.

In one or more embodiments, controlling the heater for the optical modulator device based at least in part on the maximum optical modulation amplitude determined for the optical modulator device further includes tracking an output value for a photodiode associated with the optical modulator device, and transmitting one or more heater control values to adjust a temperature of the heater. In some embodiments, the one or more heater control values are based at least in part on the tracked output value and the maximum optical modulation amplitude.

In one or more embodiments, the optical modulator device is a silicon micro-ring modulator. In one or more embodiments, the heater is controlled by a digital signal processor.

In one or more embodiments, two or more of operations 705 or 710 are substantially performed concurrently (simultaneously).

In one or more embodiments, one or more operations of method 600 may be combined with one or more operations of method 700.

While the foregoing is directed to specific examples, other and further examples may be devised without departing from the basic scope thereof, and the scope thereof is determined by the claims that follow.

What is claimed is:

1. A method of operating an optoelectronic device, comprising:
    transmitting a first data pattern to an optical modulator device of the optoelectronic device;
    determining, while transmitting the first data pattern and for each heater control value of a plurality of heater control values for a heater for the optical modulator device, a photodiode current value associated with the optical modulator device to generate a plurality of photodiode current values corresponding to the plurality of heater control values;
    determining a maximum optical modulation amplitude for the optical modulator device based at least in part on the plurality of photodiode current values corresponding to the plurality of heater control values;
    controlling the heater for the optical modulator device based at least in part on the maximum optical modulation amplitude determined for the optical modulator device; and
    transmitting at least a second data pattern to the optical modulator device.

2. The method of claim 1, wherein the maximum optical modulation amplitude is determined based at least in part on the first data pattern and at least the second data pattern.

3. The method of claim 1, wherein the first data pattern comprises a series of consecutive "0" bits, a series of consecutive "1" bits, or a series of alternating "0" bits and "1" bits.

4. The method of claim 1, further comprising:
    identifying that a first heater control value associated with a first photodiode current value in a range of heater control values exceeds a threshold value; and
    adjusting the range to determine the plurality of heater control values based at least in part on the range of the heater control values exceeding the threshold value.

5. The method of claim 1, further comprising:
    determining, for each optical modulator device of a plurality of optical modulator devices, a maximum optical modulation amplitude for the optical modulator device, each optical modulator device of the plurality of optical modulator devices associated with a corresponding heater of a plurality of heaters; and
    controlling each heater of the plurality of heaters according to the maximum optical modulation amplitude determined for the optical modulator device corresponding to the heater.

6. The method of claim 1, wherein controlling the heater for the optical modulator device based at least in part on the maximum optical modulation amplitude determined for the optical modulator device comprises:
    tracking an output value for a photodiode associated with the optical modulator device; and
    transmitting one or more heater control values to adjust a temperature of the heater, the one or more heater control values based at least in part on the tracked output value and the maximum optical modulation amplitude.

7. The method of claim 1, wherein the optical modulator device comprises a silicon micro-ring modulator.

8. The method of claim 1, wherein the heater is controlled by a digital signal processor.

9. A method of operating an optoelectronic device, comprising:
    transmitting a plurality of data patterns to an optical modulator device of a plurality of optical modulator devices of the optoelectronic device;
    determining a plurality of optical power values for the plurality of data patterns, each transmitter data pattern of the plurality of data patterns corresponding to one of the plurality of optical power values;
    determining a maximum optical modulation amplitude for the optical modulator device based at least in part on the plurality of optical power values and based at least in part on the plurality of data patterns; and
    controlling a heater for the optical modulator device based at least in part on the maximum optical modulation amplitude determined for the optical modulator device.

10. The method of claim 9, further comprising:
    determining, while transmitting a first data pattern of the plurality of data patterns, and for each heater control value of a plurality of heater control values for the heater, a photodiode current value associated with the optical modulator device to generate a plurality of photodiode current values corresponding to the plurality of heater control values,
    wherein the optical power value for the first data pattern is determined based at least in part on the plurality of photodiode current values and the plurality of heater control values corresponding to the plurality of photodiode current values.

11. The method of claim 9, wherein at least one of the plurality of data patterns comprises a series of consecutive "0" bits, a series of consecutive "1" bits, or a series of alternating "0" bits and "1" bits.

12. The method of claim 9, further comprising:
identifying that a first heater control value associated with a first photodiode current value in a range of heater control values exceeds a threshold value; and
adjusting the range to determine the heater control values based at least in part on the range of the heater control values exceeding the threshold value.

13. The method of claim 9, wherein controlling the heater for the optical modulator device based at least in part on the maximum optical modulation amplitude determined for the optical modulator device comprises:
tracking an output value for a photodiode associated with the optical modulator device; and
transmitting a heater control value to adjust a temperature of the heater, the heater control value based at least in part on the tracked output value and the maximum optical modulation amplitude.

14. The method of claim 9, wherein the optical modulator device comprises a silicon micro-ring modulator.

15. The method of claim 9, wherein the plurality of optical power values are determined by a digital signal processor.

16. An optoelectronic device, comprising:
an optical modulator device;
a heater thermally coupled with the optical modulator device;
a photodiode associated with the optical modulator device; and
control circuitry coupled with the heater and the photodiode, the control circuitry to:
transmit a first data pattern to the optical modulator device;
determine, while transmitting the first data pattern and for each heater control value of a plurality of heater control values for the heater, a photodiode current value for the photodiode to generate a plurality of photodiode current values corresponding to the plurality of heater control values;
determine a maximum optical modulation amplitude for the optical modulator device based at least in part on the plurality of photodiode current values corresponding to the plurality of heater control values;
control the heater based at least in part on the maximum optical modulation amplitude determined for the optical modulator device; and
transmit at least a second data pattern to the optical modulator device.

17. The optoelectronic device of claim 16, further comprising:
a plurality of optical modulator devices coupled with the control circuitry; and
a plurality of heaters, each optical modulator device of the plurality of optical modulator devices associated with a corresponding heater of the plurality of heaters,
wherein the control circuitry is further to:
determine, for each optical modulator device of the plurality of optical modulator devices, a maximum optical modulation amplitude for the optical modulator device; and
control each heater of the plurality of heaters according to the maximum optical modulation amplitude determined for the optical modulator device corresponding to the heater.

18. The optoelectronic device of claim 16, further comprising:
a digital to analog converter coupled with the control circuitry and the heater, wherein the control circuitry is further to:
track an output value for the photodiode; and
transmit one or more heater control values to the digital to analog converter to adjust a temperature of the heater, the one or more heater control values based at least in part on the tracked output value and the maximum optical modulation amplitude.

19. The optoelectronic device of claim 16, wherein the optical modulator device comprises a silicon micro-ring modulator.

20. The optoelectronic device of claim 16, wherein the maximum optical modulation amplitude is determined based at least in part on the first data pattern and at least the second data pattern.

* * * * *